United States Patent
Solmaz et al.

(10) Patent No.: US 10,906,535 B2
(45) Date of Patent: Feb. 2, 2021

(54) SYSTEM AND METHOD FOR VULNERABLE ROAD USER DETECTION USING WIRELESS SIGNALS

(71) Applicant: NEC Laboratories Europe GmbH, Heidelberg (DE)

(72) Inventors: Guerkan Solmaz, Heidelberg (DE); Miguel Garcia Galvao Almeida, Ettlingen (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 281 days.

(21) Appl. No.: 16/057,837

(22) Filed: Aug. 8, 2018

(65) Prior Publication Data
US 2019/0351896 A1    Nov. 21, 2019

Related U.S. Application Data

(60) Provisional application No. 62/673,372, filed on May 18, 2018.

(51) Int. Cl.
| | |
|---|---|
| B60W 30/00 | (2006.01) |
| B60W 30/09 | (2012.01) |
| G08G 1/0962 | (2006.01) |
| G08G 1/01 | (2006.01) |
| B60Q 9/00 | (2006.01) |
| G05D 1/02 | (2020.01) |

(Continued)

(52) U.S. Cl.
CPC ............ *B60W 30/09* (2013.01); *B60Q 9/008* (2013.01); *B60W 50/14* (2013.01); *G01S 5/14* (2013.01); *G01S 13/931* (2013.01); *G05D 1/0214* (2013.01); *G08G 1/0129* (2013.01); *G08G 1/0962* (2013.01); *B60W 2554/00* (2020.02); *G01S 2013/9318* (2020.01); *G01S 2013/93185* (2020.01); *H04W 4/40* (2018.02)

(58) Field of Classification Search
None
See application file for complete search history.

(56) References Cited

U.S. PATENT DOCUMENTS

| | | | | |
|---|---|---|---|---|
| 5,268,692 A | * | 12/1993 | Grosch | G01S 13/931 342/70 |
| 2004/0257274 A1 | * | 12/2004 | Benco | G01S 5/0263 342/357.4 |

(Continued)

OTHER PUBLICATIONS

Article titled "Pedestrian Detection and Localization Using Antenna Array and Sequential Triangulation" by Shi et al. and published in Sep. 2005. (Year: 2005).*

(Continued)

*Primary Examiner* — Blake A Tankersley
(74) *Attorney, Agent, or Firm* — Leydig, Voit & Mayer, Ltd.

(57) ABSTRACT

A method for detecting vulnerable road users (VRUs) using wireless signals includes receiving, by a wireless receiver, wireless signals from mobile devices and determining received signal strength indication (RSSI) levels of the wireless signals. The wireless signals and the RSSI levels of the wireless signals received by the wireless receiver are analyzed so as to determine at least one location of the VRUs. A notification is issued to the vehicle or a driver of the vehicle based on the at least one determined location of the VRUs.

17 Claims, 8 Drawing Sheets

(51) Int. Cl.
  *G01S 5/14*   (2006.01)
  *G01S 13/931*  (2020.01)
  *B60W 50/14*  (2020.01)
  *H04W 4/40*   (2018.01)

(56) References Cited

U.S. PATENT DOCUMENTS

| | | | | |
|---|---|---|---|---|
| 2017/0017846 | A1* | 1/2017 | Felemban | G06K 9/4642 |
| 2017/0124878 | A1* | 5/2017 | Enright | G08G 1/005 |
| 2017/0236347 | A1* | 8/2017 | Drako | G07C 9/22 |
| | | | | 340/5.33 |
| 2018/0090005 | A1* | 3/2018 | Philosof | G08G 1/164 |
| 2019/0073883 | A1* | 3/2019 | Hoang | G08B 25/08 |
| 2019/0331763 | A1* | 10/2019 | Abari | G01S 13/325 |

OTHER PUBLICATIONS

Fang-Jing Wu, et al., "We Hear Your Activities through Wi-Fi Signals, 2016 IEEE 3$^{rd}$ World Forum on Internet of Things (WF-IoT), Dec. 12-14, 2016, pp. 1-6.

Gürkan Solmaz, et al., "Together or Alone: Detecting Group Mobility with Wireless Fingerprints", 2017 IEEE International Conference on Communications (ICC), May 21-25, 2017, pp. 1-7.

Fadel Adib, et al., "Multi-Person Localization via RF Body Reflections", USENIX, May 4-6, 2015, pp. 1-14.

Fadel Adib, et al., "See Through Walls with Wi-Fi!", ACM SIGCOMM '13, Aug. 2013, pp. 1-12.

Xiaofei Li, et al., "A Unified Framework for Concurrent Pedestrian and Cyclist Detection", IEEE Transactions on Intelligent Transportation Systems, vol. 18, No. 2, Feb. 2017, pp. 269-281.

Dirk Lill, et al., "Development of a Wireless Communication and Localization System for VRU eSafety", 2010 7$^{th}$ International Symposium on Communication Systems, Networks & Digital Signal Processing (CSNDSP 2010), Jul. 21-23, 2010, pp. 459-463.

Fang-Jing Wu, et al., „Crowd Estimator: Approximating Crowd Sizes with Multi-modal Data for Internet-of-Things Services, MobiSys '18 Proceedings of the 16$^{th}$ Annual International Conference on Mobile Systems, Applications, and Services, Jun. 10-15, 2018, pp. 337-349.

* cited by examiner

SYSTEM AND METHOD FOR VULNERABLE ROAD USER DETECTION USING WIRELESS SIGNALS

CROSS-REFERENCE TO PRIOR APPLICATION

Priority is claimed to U.S. Provisional Application No. 62/673,372 filed on May 18, 2018, the entire contents of which is hereby incorporated by reference herein.

The project leading to this application has received funding from the European Union's Horizon 2020 research and innovation program under grant agreement No 731993.

FIELD

The present invention relates to methods and systems for detecting vulnerable road users (VRUs) using wireless signals.

BACKGROUND

Detection of VRUs, such as cyclists or pedestrians, is a topic which has attracted great interest from the car industry because fast and reliable detection of VRUs can be used to significantly enhance traffic safety. Most of the existing solutions for VRU detection are either image-based (e.g., video cameras) or rely on distance sensors (e.g., short or long range radars, laser scanners). For example, Li, Xiaofei, et al., "A unified framework for concurrent pedestrian and cyclist detection," IEEE Transactions on Intelligent Transportation Systems 18.2: 269-281 (February 2017), which is hereby incorporated by reference herein, describes a camera-based approach for detecting pedestrians and cyclists using image analysis. Lill, Dirk, et al., "Development of a wireless communication and localization system for VRU eSafety," 2010 7th International Symposium on Communication Systems, Networks & Digital Signal Processing (CSNDSP 2010), pp. 459-463 (2010), which is hereby incorporated by reference herein, discuss a cooperative system using a combination of both images and distance sensors.

SUMMARY

In an embodiment, the present invention provides a method for detecting vulnerable road users (VRUs) using wireless signals. A wireless receiver receives wireless signals from mobile devices and determines received signal strength indication (RSSI) levels of the wireless signals. The wireless signals and the RSSI levels of the wireless signals received by the wireless receiver are analyzed so as to determine at least one location of the VRUs. A notification is issued to the vehicle or a driver of the vehicle based on the at least one determined location of the VRUs.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
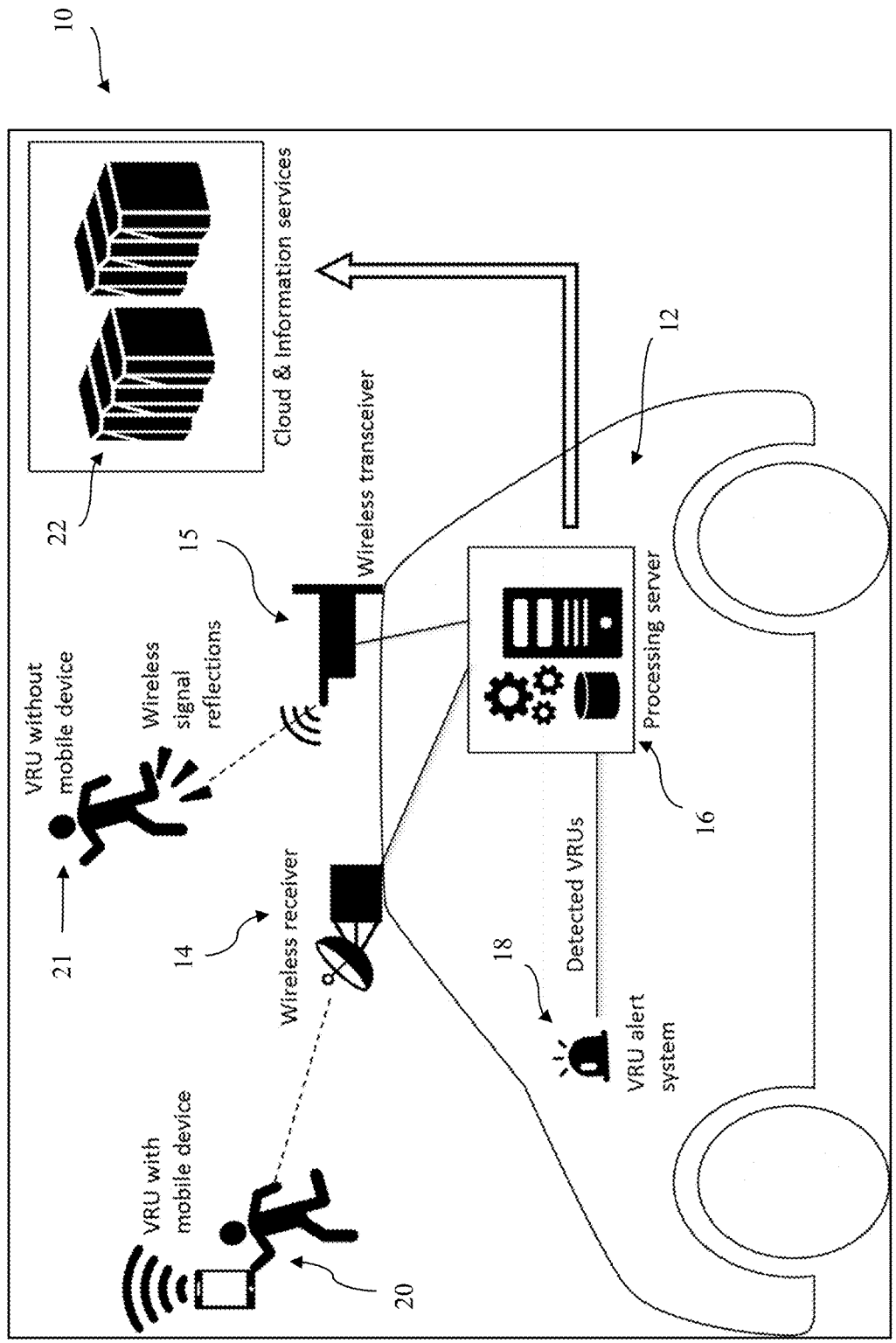
FIG. 1 is a schematic system overview according to an embodiment of the present invention.

Embodiments of the present invention provide a method and systems for detecting VRUs by receiving wireless signals sent by or reflected from the VRUs through a wireless receiver and a wireless transceiver which are part of RSUs and/or are built-in or attached to the vehicles themselves. In addition to providing faster and/or more reliable detection of VRUs compared to image-based or distance sensor-based approaches, embodiments of the present invention can be particularly advantageously implemented in autonomous vehicles. In this case, VRU detection can be performed locally and activities or actions based thereon can be self-enforced. Moreover, compared to the existing image-based approaches which are computationally burdensome, VRU detection according to embodiments of the present invention can be performed more quickly at reduced computational costs, and at reduced costs and constraints for associated hardware. This is an especially important improvement in the field of traffic safety, and particularly in the context of autonomous driving, in which even relatively small delays in detection caused by required computational effort can result in an accident either being avoided or not.

Wireless signals such as Wi-Fi or Bluetooth can be used to try to gain an understanding of mobility patterns of people. For example, F. J. Wu, et al., "We Hear Your Activities Through Wi-Fi Signals," In Proceedings of IEEE World Forum on the Internet of Things (WF-IoT '16), pp. 251-256 (December 2016) and G. Solmaz, et al., "Together or Alone: Detecting Group Mobility with Wireless Fingerprints," In Proceedings of IEEE ICC '17 (May 2017), each of which is hereby incorporated by reference herein, discuss using Wi-Fi and Bluetooth, respectively, to not only detect people in the vicinity, but also understand their mobility behaviors such as waiting (static), walking, running or moving in a group. Wireless signals (e.g., Wi-Fi probes or Bluetooth signals) which are coming from mobile devices of individuals can be sniffed with a wireless receiver device. These devices can be cellular phones (e.g., smartphones), tablet computers, or in the Bluetooth case Bluetooth Low Energy (BLE) beacons. This approach, also referred to herein as the mobile device-based approach, uses the received signal strength indication (RSSI) levels to help understand some of the mobility behaviors. As a simple example, if there is no received wireless signal for a time period, this might indicate that no one exists in the vicinity of the wireless receiver device. If wireless signals are received from a device and the RSSI levels are relatively high and stable, this might indicate that someone is waiting close to the wireless receiver device. While the mobile device-based approach can be used to provide information about mobility patterns of the individuals who carry the mobile devices, the existing solutions rely on statically placed wireless receivers for sniffing out the wireless signals. The mobility behaviors are determined relative to the known, fixed position of the wireless receivers.

Additionally, Static deployment of Wi-Fi collectors is useful to understand certain crowd mobility behaviors. For example, F. J. Wu, et al., "CrowdEstimator: Approximating Crowd Sizes with Multi-modal Data for Internet-of-Things Services," In Proceedings of ACM International Conference on Mobile Systems, Applications, and Services, MobiSys '18 (June 2018) which is hereby incorporated by reference herein, discuss using multi-modal information from static Wi-Fi sensors and stereoscopic cameras to estimate the crowd sizes in certain regions where pedestrians walk such as shopping malls or train stations.

It is also possible to detect people who do not carry a mobile device. This could be achieved using a device that can send and receive wireless signals. In this approach, also referred to herein as the reflection-based approach, the sent wireless signals are reflected from human bodies and then received back by the same device. F. Adib, Z. Kabelac, D. Katabi. "Multi-Person Localization via RF Body Reflections." In NSDI (pp. 279-292 (May 2015), which is hereby incorporated by reference herein, discuss localization of multiple people using such a technique. F. Adib. "See through walls with WiFi!" Vol. 43. No. 4. ACM (2013), which is hereby incorporated by reference herein, show how such a technique can be applied in indoor or outdoor environments, even in the case of existing walls blocking the way of the signals, as wireless signals can pass through walls. While the reflection-based approach can be used to localize individuals, the localization is relative to a fixed location because existing solutions are limited to the static situation in which the position of the device that can send and receive wireless signals is fixed at a particular location.

VRU detection from a vehicle presents particular challenges because the vehicle is dynamic and typically moves at a much greater rate of speed than the VRUs. Moreover, the vehicles and VRUs can each have different and adaptable paths of travel relative to each other. Despite the ability of the complex image-based and/or distance sensor-based systems to partially address these unique challenges, VRU detection from a vehicle still faces a number of unsolved problems including that:

1) The VRU may be on the road or outside of the road. The VRU outside of the road can suddenly enter the road. Therefore, people outside of the road should also be detected, especially in the case of autonomous driving.
2) There is an unlimited number of environments (e.g., road intersections, buildings nearby, walls, trees) and physical conditions (e.g., limited day light, shadows, darkness, dynamic obstacles such as people blocking the view of others), as well as various traffic conditions (e.g., road closures, accidents, traffic jams). The VRU detection should operate reliably in all these environments and conditions.
3) VRU detection is an extremely time-critical operation. Any failure or small delay in the operation may cause injuries or death of people in traffic.
4) The data processing for all received inputs from different sensors is computationally complex (especially for certain computer vision-based algorithms or solutions) which requires significant time and computational processing power.

In particular, the existing approaches and technologies (such as using video cameras) are unable to adequately detect VRUs in cases of darkness (e.g., streets without much lighting), obstacles that block the view of the camera or distance sensors, areas where usage of camera is not allowed due to privacy constraints. Moreover, these solutions require, in addition to expensive equipment such as the cameras, a high amount of computational processing power, as well as specialized hardware such as Graphics Processing Units (GPUs) relative to embodiments of the present invention.

According to an embodiment of the present invention, a method for detecting vulnerable road users (VRUs) using wireless signals, includes: receiving, by a wireless receiver, wireless signals from mobile devices and determining received signal strength indication (RSSI) levels of the wireless signals; analyzing the wireless signals and the RSSI levels of the wireless signals received by the wireless receiver so as to determine at least one location of the VRUs; and issuing a notification to a vehicle or a driver of the vehicle based on the at least one determined location of the VRUs.

According to the same or a different embodiment of the present invention, the wireless receiver is disposed at a first static location, and a second wireless receiver is disposed at a second static location, the first and second locations being known with respect to each other, and wherein wireless signals received by the second wireless receiver and associated RSSI levels are analyzed together with the wireless signals received at the first static location to determine the at least one location of the VRUs.

According to the same or a different embodiment of the present invention, the wireless receiver is attached to or embedded in the vehicle.

According to the same or a different embodiment of the present invention, a second wireless receiver is disposed at a static location, and wireless signals received by the second wireless receiver and associated RSSI levels are analyzed together with the wireless signals received at the vehicle to determine the at least one location of the VRUs.

According to the same or a different embodiment of the present invention, the method includes receiving, by a wireless transceiver, wireless signals sent by the wireless transceiver and reflected back to the wireless transceiver from objects in the vicinity of the vehicle, wherein the wireless signals reflected back to the wireless transceiver are used to determine at least one location of at least one additional VRU which does not have a mobile device.

According to the same or a different embodiment of the present invention, the wireless signals are received by the wireless receiver at a plurality of time intervals, the method further comprising determining an estimation area for the at least one location of the VRUs at each of the time intervals and then determining a calibrated estimation area for the at least one location of the VRUs from the estimation areas.

According to the same or a different embodiment of the present invention, the method includes: comparing a distance from the vehicle to the at least one determined location of the VRUs to an estimated stopping distance of the vehicle; determining a behavior of the VRUs based on the wireless signals that are received by the wireless receiver at the plurality of time intervals; and determining whether the behavior of the VRUs is expected at the at least one determined location of the VRUs, wherein the notification to the vehicle or the driver includes a description of the behavior where it is determined that the behavior is not expected for the VRUs at the at least one determined location.

According to the same or a different embodiment of the present invention, the vehicle is an autonomous vehicle, the method further comprising issuing a control action for stopping the vehicle or diverting a path of the vehicle based on a determination that the behavior is not expected for the VRUs at the at least one determined location.

According to the same or a different embodiment of the present invention, the method includes storing the behavior and the at least one determined location in a database, wherein the determining whether the behavior of the VRUs is expected at the at least one determined location of the VRUs is performed by checking the database.

According to the same or a different embodiment of the present invention, the method includes identifying the mobile devices from the wireless signals received by the wireless receiver and determining that one of the VRUs carries at least two of the mobile devices based on reflections from the one of the VRUs being received by the wireless transceiver indicating a single entity.

According to the same or a different embodiment of the present invention, the wireless receiver includes a plurality of antennas which change directions during the receiving of the wireless signals from the mobile devices, the method further comprising using trilateration on the received wireless signals to determine the at least one location of the VRUs.

According to the same or a different embodiment of the present invention, the method includes the vehicle self-enforcing a dynamic speed limit which was changed in the vehicle based on the VRU detection and broadcasting the changed speed limit to other vehicles in the vicinity using vehicle-to-vehicle communications.

According to an embodiment, a system for detecting vulnerable road users (VRUs) is provided, the system being configured to communicate with a wireless receiver configured to receive wireless signals from mobile devices. The system includes: a processing server configured to analyze the wireless signals and received signal strength indication (RSSI) levels of the wireless signals received by the wireless receiver so as to determine at least one location of the VRUs; and an alert system configured to issue a notification to the vehicle or a driver of the vehicle based on the at least one determined location of the VRUs According to the same or a different embodiment of the present invention, the wireless receiver is attached to or embedded in the vehicle.

According to the same or a different embodiment of the present invention, a second wireless receiver is disposed at a static location, and the processing server is configured to analyze wireless signals received by the second wireless receiver and associated RSSI levels together with the wireless signals received at the vehicle to determine the at least one location of the VRUs.

FIG. 1 is a high-level system overview of a system 10 for VRU detection. A vehicle 12, which can be an autonomous or non-autonomous vehicle (e.g., car, bus, truck, motorbike, and bicycle), has a built-in (embedded) or attached wireless device including a wireless receiver 14 and/or a wireless transceiver 15. The vehicle 12 also includes an embedded computer or processing server 16 programmed to use the inputs from the wireless device and run the analytics for detecting VRUs. The vehicle 12 can also include a VRU alert system 18, for example, including a display, warning light and/or alarm, and/or consisting of a controller for directing corrective actions of the vehicle 12, which is notified by the processing server 16 if one or more VRUs are detected. In such a vehicular system as schematically shown, embodiments of the present invention provide for wireless signal-based VRU detection, as well as a dynamic localization estimation method for accurate VRU localization.

While embodiments of the present invention provide for a number of improvements over existing VRU detection systems as discussed above, such as in terms of speed and computational resource savings, embodiments of the present invention can also be used to enhance and improve existing VRU detection systems which are based on cameras, radar, or LIDAR technologies. For example, embodiments of the present invention can be used therein to localize VRUs accurately from the vehicle 12 with usage of a wireless receiver 14 and a wireless transceiver 15, where the localization is handled by software which resides in a processing server 16 within the vehicle 12. Alternatively or additionally, according to another embodiment, the wireless receiver 14 and/or the wireless transceiver 15, optionally along with the processing server 16, are located in an RSU 28 (see FIG. 3). According to this embodiment, the location of the VRUs can be accurately detected at the RSU, e.g., using the trilateration methods described herein, and the behaviors of the VRUs, e.g., being expected or unexpected, can be determined from taking multiple measurements of the VRUs. For example, if the behavior is unexpected (e.g., moving into the road at a time or location which creates a hazard (e.g., with respect to the road type, vehicle locations and vehicle trajectories, etc.)), then actions can be taken as discussed herein by the road-side unit broadcasting alerts to nearby vehicles.

The wireless receiver 14 is used for VRUs with a mobile device 20. The wireless receiver 14 collects Wi-Fi or Bluetooth packets (or both) from the mobile devices. If the VRU with a mobile device 20 has an application installed, the GPS location of the VRU can be sent to the wireless receiver 14 through Wi-Fi or Bluetooth. If such an application is not installed, the Wi-Fi probes of the mobile devices can be sniffed by the wireless receiver 14. Moreover, Bluetooth signals can be sniffed or received from broadcasted messages (e.g., from a BLE beacon device). The wireless receiver 14 has built-in software which is designed to take the received signals as input and output them to the processing server 16.

The wireless transceiver 15 is used for VRUs without a mobile device 21, and can also be used for the VRUs with a mobile device 20. The wireless transceiver 15 first broadcasts wireless signals and then detects (through its receiver) the reflections of these signals. The wireless transceiver 15 has built-in software which is designed to take the received signals as input and output them to the processing server 16.

The processing server 16 is equipped with software running on hardware including a processing unit for performing VRU detection according to an embodiment of the present invention. The processing server 16 has access to physical data storage (e.g., database), as well as a network communicator and multiple analytics modules. The network communicator is used to receive packets from the wireless device and share VRU detection information with the vehicle. The database storage keeps the received packets from the wireless receiver 14 and/or wireless transceiver 15. The analytics modules run on top of the processing unit and send warnings to the VRU alert system 18 when VRUs are detected. In a case where an embodiment of the present invention is used to improve existing image-based and/or distance sensor-based systems, the processing server 16 can be programmed to share the VRU detection information with the existing systems of the vehicle (e.g., the camera-based system). Preferably, the processing server 16 resides within the vehicle 12 for faster processing, quicker issuance and reception of control actions and avoidance of delay or communication malfunction. However, in different embodiments, the processing server 16 does not have to reside in the vehicle 12. The processing server 16 could also be physically located in one or more RSUs or in the Cloud.

The VRU alert system 18 is active in a case where the processing server 16 sends VRU detection information. In the case of an autonomous vehicle, the autonomous driving control system of the vehicle 12 is notified by the VRU alert system 18. The autonomous driving control system can then use the VRU detection information, for example including a dynamic localization estimation, to make safe traffic decisions and/or take safety actions to account for and avoid the detected VRUs. In the case of a non-autonomous vehicle, the driver of the vehicle 12 is alerted, preferably with a visual or an auditory signal.

Preferably, the processing server 16 is connected via a wireless network to cloud servers 22 to receive data from the processing server 16 in the vehicle 12. The cloud servers 22 can then be used to store historical data representing old measurements. Information services can share the data with various other applications and can provide a user interface and visualization. The data could be used by traffic operators or with other vehicles, e.g., so they may choose to travel a particular route with fewer VRUs or can avoid potential conflicts with localized VRUs.

For the wireless receiver 14 and the wireless transceiver 15, multiple antennas can be used to enhance accuracy. Alternatively or additionally, directional antennas that change direction very quickly can be advantageously used. With such fast directional changes, localization through trilateration is possible. For example, 3 RSSI values from 3 different locations could be used for trilateration. For the transceiver, each signal, e.g., for 3 different locations, may give an estimated distance to a VRU without a mobile device 21, and therefore trilateration is also possible using the transceiver and the same logic. Alternatively or additionally, a beamforming technique can be used with an array of antennas to further enhance accuracy. According to an embodiment of the present invention, a combination of beamforming and leveraging the movement of the car for trilateration is provided for better detection of pedestrians.

According to an embodiment, the antenna can be at least one monopole omnidirectional antenna with an omnidirectional radiation pattern and having a gain of, for example, 3 dBi.

Figure 2:
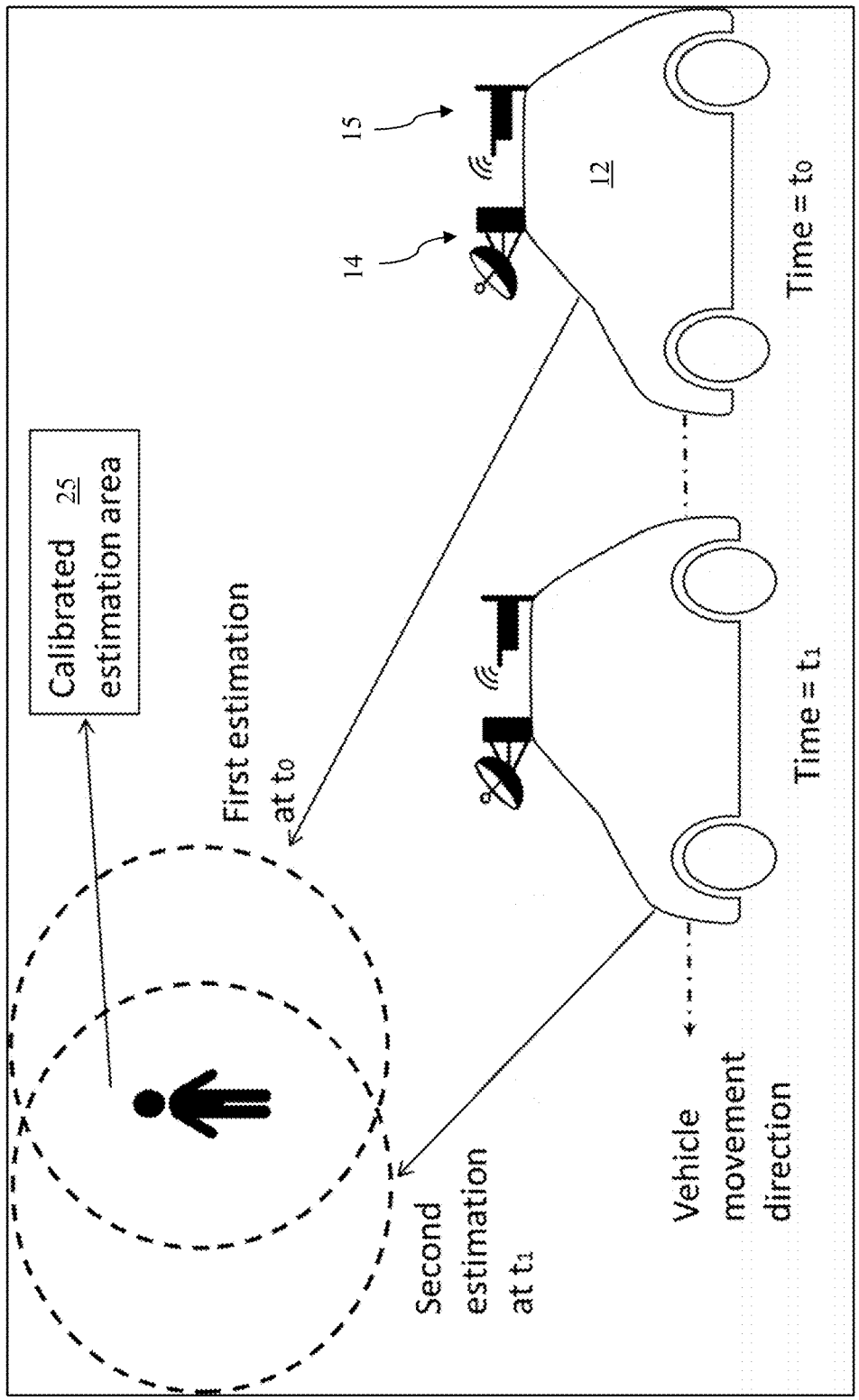
FIG. 2 schematically illustrates a method for dynamic localization from a vehicle according to an embodiment of the present invention.

The dynamic localization estimation from the vehicle according to an embodiment of the present invention schematically illustrated in FIG. 2 provides for accurate localization even though the wireless receiver 14 and/or transceiver 15 are moving with the vehicle 12 relative to the VRUs. In fact, the movement of the vehicle can be advantageously leveraged, e.g., by using 3 RSSI values for trilateration and/or determining relative directions of the vehicle 12 and VRU 25 using such RSSI values at different times. The position and direction of the vehicle can be determined easily and accurately at different times using a GPS sensor of the vehicle 12, and is preferably considered for each estimate of VRU location at each time interval.

FIG. 2 shows the same vehicle 12 with two measurements and localization estimations during its travel at times $t_0$ and $t_1$. Based on two estimations for times $t_0$ and $t_1$ represented by the circles in dashed lines, the location of a VRU 25 can be more accurately estimated using a calibrated estimation area consisting of an area of overlap between the two estimations. According to an embodiment of the present invention, a location estimation is provided as a circular area with a certain radius, where the estimated location is the center point and the radius represents the possible error range. When two such estimates representing two circular areas are obtained, their area of intersection can be used as the final estimate. Similar logic applies to more than two circular estimates. The strategy assumes that the VRU is static, or since the vehicle is very fast relative to the VRU, the strategy takes the advantage of this fact by taking multiple location estimates from the vehicle. Even though the VRU can be moving, this movement could be neglected for very short period of times (e.g., half a second or less). While FIG. 2 shows the simplified case of two estimations and only one VRU 25, which is a pedestrian, it is to be understood that more measurements and estimates could be made at times $t_0, t_1, t_2, \ldots, t_n$ and that the estimations can be applied to many pedestrians and cyclists simultaneously.

For the VRUs with mobile devices 20, their device's IDs such as a media access control (MAC) address can be used to differentiate one person from another. In the case of a VRU carrying multiple wireless devices, the estimation may result in two estimation areas. This problem is a limitation of existing mobile device-based approaches. However, this problem is overcome according to an embodiment of the present invention in that, by additionally using the wireless transceiver, the pedestrian or the cyclist can be detected as a single entity through the wireless signal reflections from the body (and the bicycle in the case of cyclist).

The approach according to an embodiment of the present invention using the combination of the wireless receiver 14 and the wireless transceiver 15 leverages the fact that the vehicles mostly have relatively high speeds compared to the relatively low speeds of the pedestrians or cyclists by allowing the vehicle to take many measurements from different positions, even in a case where only a single omnidirectional antenna is used. Due to the time criticalness of traffic safety scenarios, the detection of the VRU should be quick which means that the time difference between times $t_0, t_1, t_2, \ldots, t_n$ should be very small for certain scenarios (e.g., a second or a fraction of a second) to enable the autonomous vehicle or the driver of a non-autonomous vehicle to be notified as quickly as possible. In an embodiment, the present invention also allows for verification of VRUs having a mobile device using information from the wireless transceiver, in addition to separate detection of the VRUs with and without mobile devices in accordance with other embodiments. For example, in an embodiment of the present invention it is possible, for a VRU with a mobile device, to combine estimation areas from the wireless receiver and the wireless transceiver to predict the location and/or behavior of that VRU.

Figure 3:
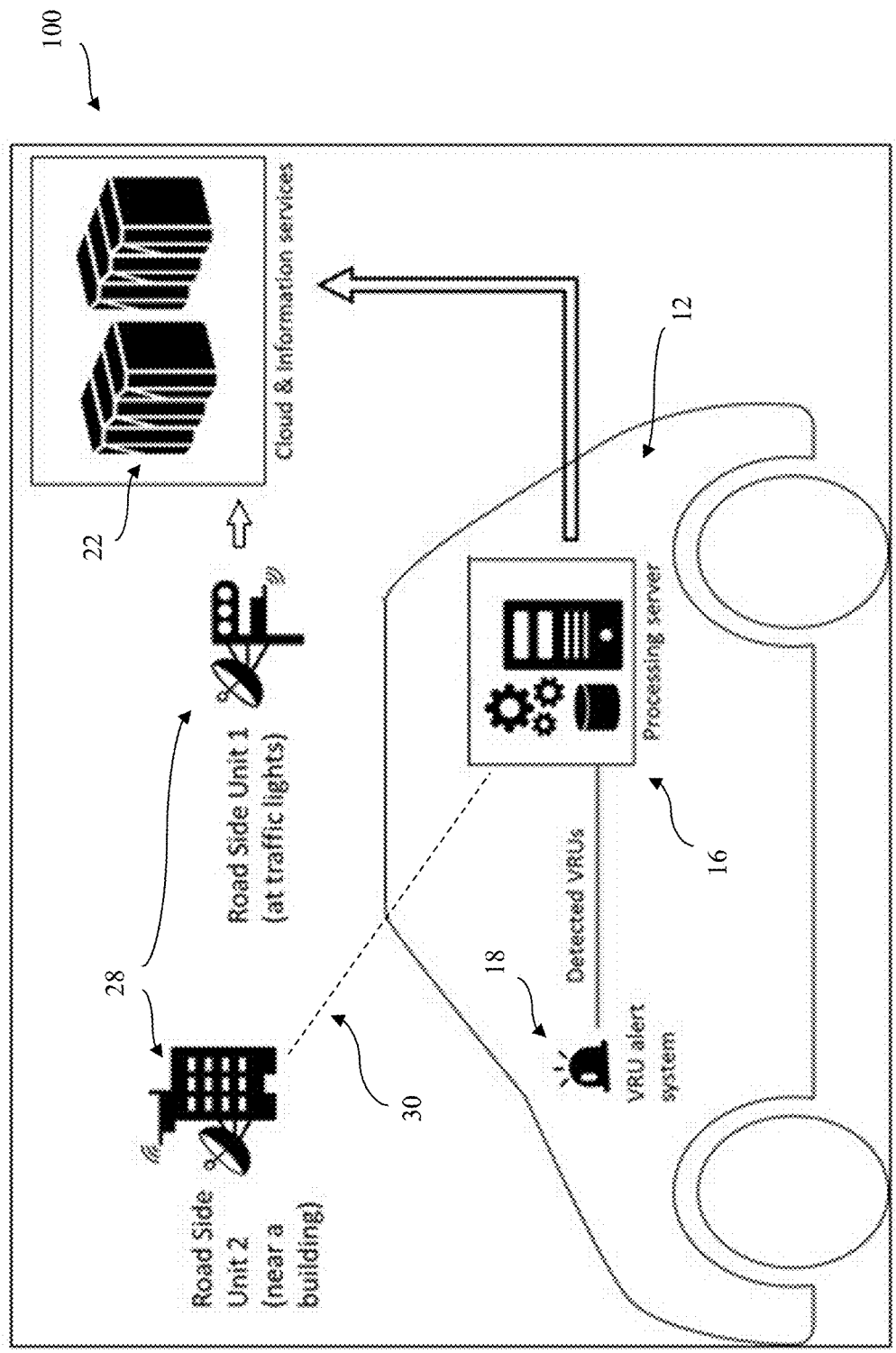
FIG. 3 is a schematic system overview according to another embodiment of the present invention including road side units (RSUs)

FIG. 3 illustrates a system 100 according to an embodiment of the present invention which uses RSUs 28. Each RSU 28 is installed in the vicinity of a road or traffic route, such as near or at a building or at traffic lights, cross-walks, bus stops, etc. Each RSU 28 includes a wireless receiver and/or transceiver which can be the same type as those described for the vehicle 12. Accordingly, the RSUs 28 are also able to collect data about the locations and mobility patterns or behaviors of VRUs with and/or without mobile devices. This data is transmitted to the vehicle 12 by an RSU to vehicle wireless communication 30 using vehicle to X (V2X) communication protocols such as ITS-G5. It is also possible for the vehicle 12 and the RSUs 28 to communicate through the Cloud or using a short-range communication to receiver in the vehicle 12. The RSUs 28 can localize and/or determine behaviors of the VRUs using the techniques above. In this case, as compared an embodiment in which the wireless receiver and/or transceiver are attached to the vehicle 12, the RSUs 28 do not treat the VRUs as having not moved between measurement time intervals. The vehicle 12, for example using its processing server, aggregates and processes the data from the RSUs 28, possibly along with other information from camera or sensor-based systems, and/or, according to a further embodiment, along with the data about the VRUs coming from the wireless receiver 14 and/or transceiver 15 attached to the vehicle 12. As in the embodiment above, the RSUs can also transmit information about detected and localized VRUs and/or their determined behaviors to the cloud servers 22.

Figure 4:
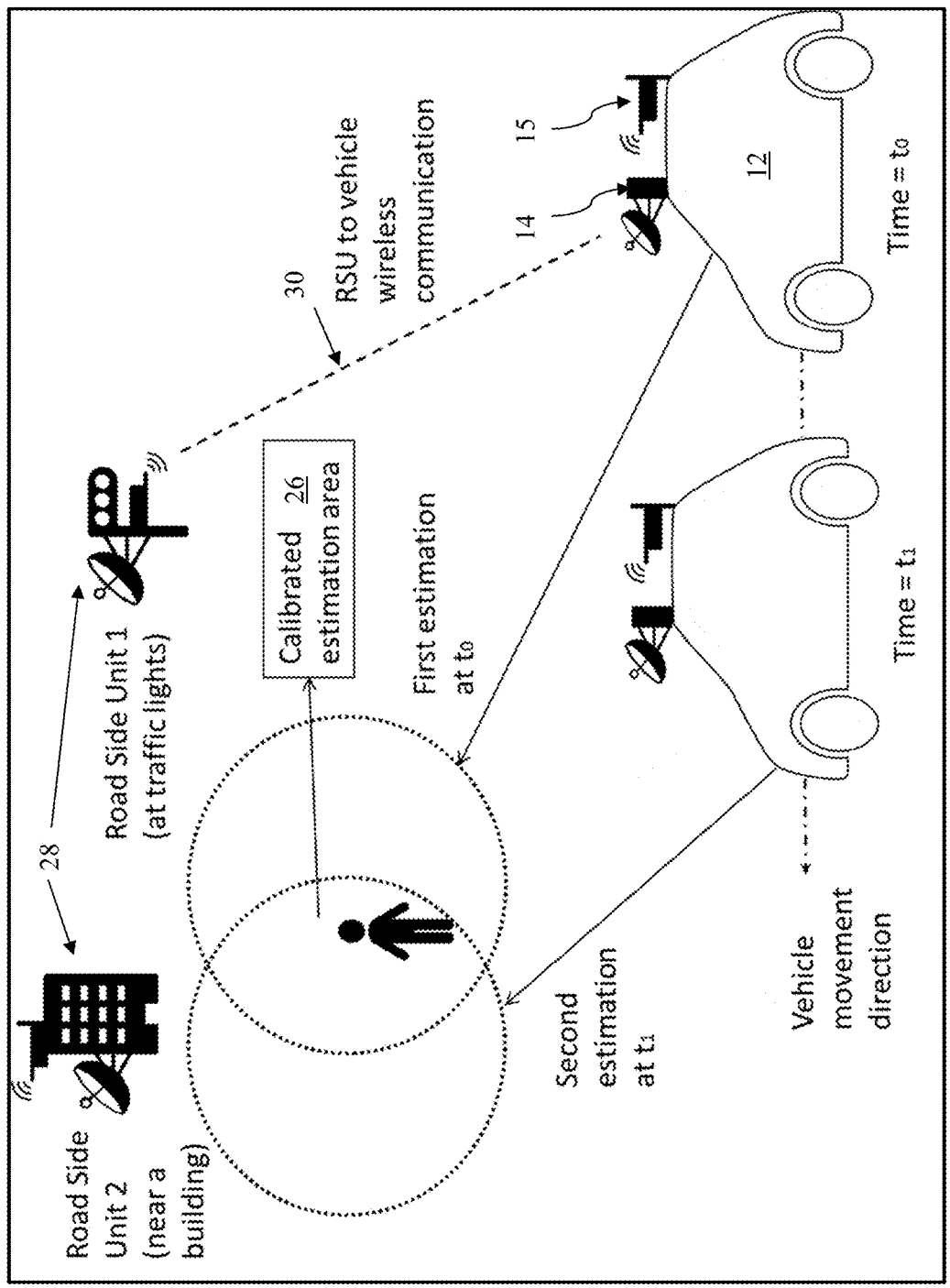
FIG. 4 schematically illustrates a system and method for dynamic localization from a vehicle using the RSUs.

For example, the data from the RSUs 28 can be used to confirm, correct and/or more accurately locate the VRUs and their respective mobility pattern and behavior. Referring to FIG. 4, the estimation areas from the vehicle 12 at time $t_0$ and $t_1$ (e.g., through triangulation or trilateration) in combination with location estimations from the VRUs can be used to provide a calibrated estimation area 26 of reduced size as the additional inputs from the RSUs 28 can be used to further delimit, shift and/or reduce the size of the estimation areas. For example, a final estimation area could be provided by overlapping areas of at least two estimation areas from the vehicle 12 and at least two estimation areas of the RSUs. Moreover, mobility patterns or behaviors of the VRUs detected by the RSUs 28 can be used to predict next location estimations for subsequent time intervals. Improved location estimations for the VRUs can also be obtained by using data from two or more RSUs 28 at different locations which can then be used for triangulation or trilateration. In this case, multiple triangulations or trilaterations (e.g., at times $t_0$ and $t_1$) can be performed from different locations of the vehicle 12 during its travel (e.g., as the vehicle 12 reaches an intersection at which the RSUs 28 are statically installed).

According to an embodiment, the RSUs 28 can localize vehicles with respect to the VRUs. For example, the wireless receivers and/or the transceivers of the RSUs 28 could be used for this purpose. Multiple measurements from multiple RSUs 28 at known, fixed locations can be combined by a processing server to localize the vehicle in the same manner as the VRUs (e.g., by trilateration). Preferably, where the vehicle 12 has its own installed wireless receiver 14, the RSSI-based distance estimations can be performed from the RSUs or from the vehicle.

Figure 5:
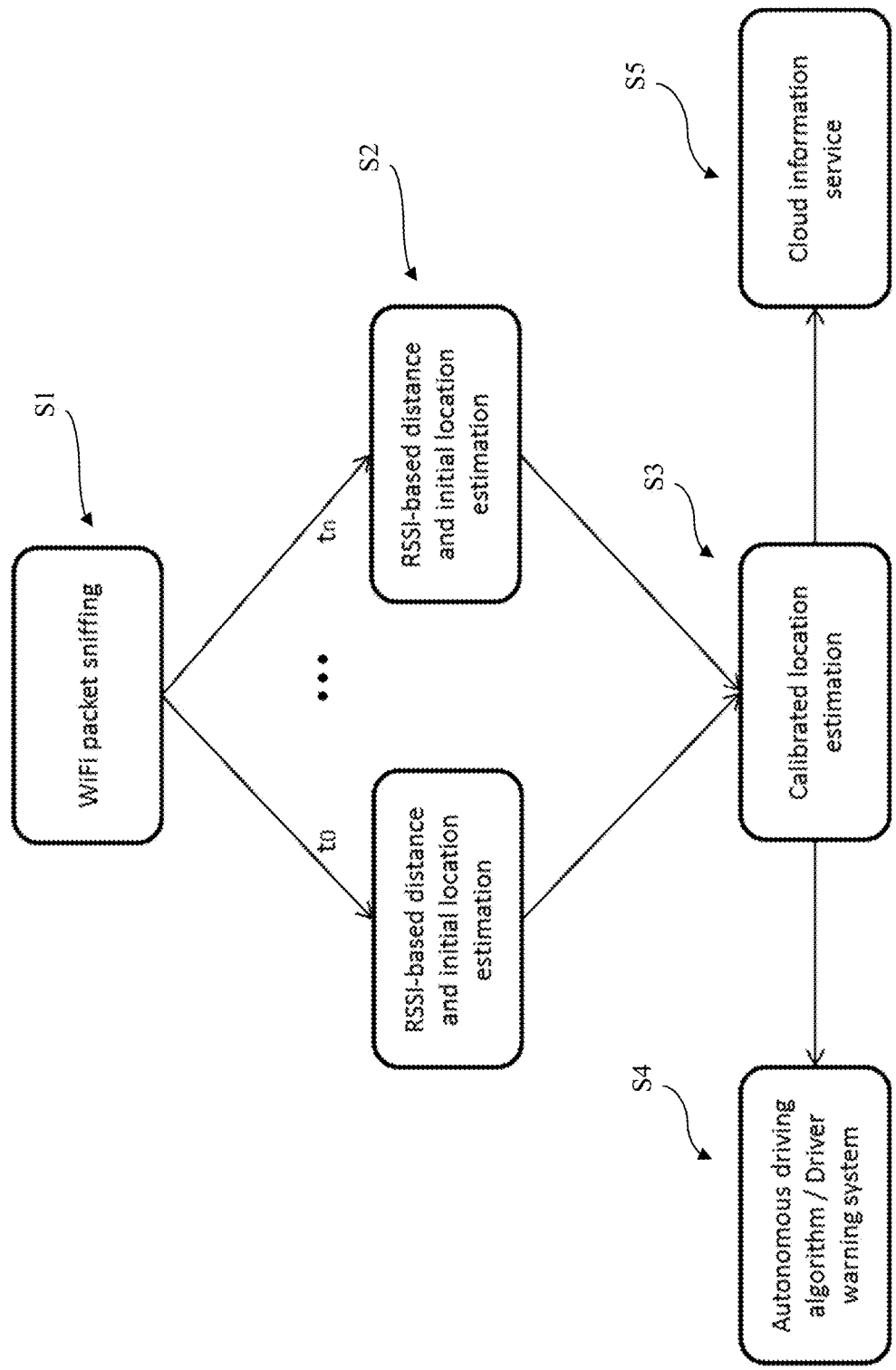
FIG. 5 is a flow chart illustrating steps of the method for dynamic localization estimation according to an embodiment of the present invention.

FIG. 5 shows a flow chart illustrating steps of a dynamic localization estimation mechanism according to an embodiment of the present invention. While the vehicle is moving it keeps recording WiFi data in a step S1, for example by sniffing for WiFi packets and/or receiving data through an application installed on the mobile devices. Alternatively or additionally, the RSUs records the Wifi data. At different times $t_0$ to $t_n$ at which measurements are received, an RSSI-based distance and initial location estimation can be made in step S2 for each time. The data captured can be further enhanced, in terms of directional insights, by using techniques that include, but are not limited to, beamforming, rotating directional antennas and/or meta antennas. The mechanism then uses the recorded data to identify VRUs and create a probabilistic model about the location of the VRUs, which over a period of time, is improved with information coming from multiple location estimations that are refined into a calibrated model. By applying the calibrated model to the recorded data, a calibrated location estimation is made in a step S3. The probabilistic models provide an estimated location point with a surrounding circular region to represent the possibility of error. The calibrated model can be produced from the probabilistic model by determining the intersecting regions and spatial overlap of the probabilistic models. Then, in a step S4, the calibrated location estimation is then used within the vehicle to make autonomous driving decisions for autonomous cars or is displayed (or used as a warning to the driver) for non-autonomous cars. The calibrated location estimation is also transmitted to a cloud server in a step S5 for further distribution to other connected users (e.g., other vehicles, other road users or traffic operators).

Figure 6:
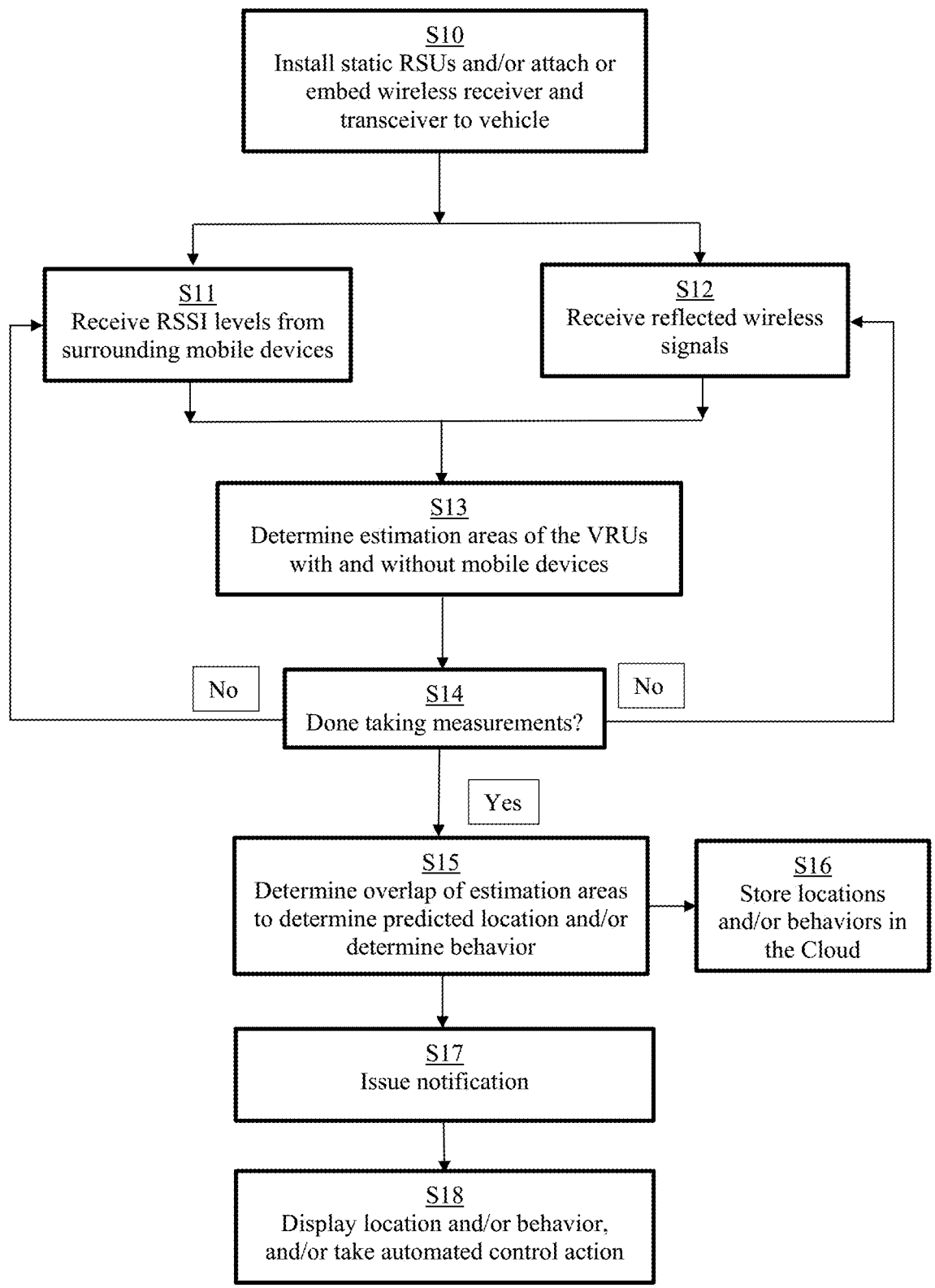
FIG. 6 is a flow chart is a flow chart illustrating steps of a method for detecting VRUs with and without mobile devices and for taking actions based thereon.

FIG. 6 illustrates a method for detecting VRUs with and without mobile devices according to an embodiment of the present invention. In a step S10, an RSU is installed and/or a wireless receiver and a wireless transceiver are attached to or embedded in the vehicle. In steps S11 and S12 carried out simultaneously the wireless receiver receives RSSI signal levels it sniffs out for the mobile devices within its detection range and the wireless transceiver receives back the wireless signals it emits after reflection from VRUs. In a step S13, an estimation area is determined for each VRU based on the estimated location from the RSSI signal or the reflected wireless signal, as the case may be, taking into account an expected error. The expected error can be based, for example, on experimental or historical data. In a step S14, it is determined whether further measurements should be taken. If additional measurements are to be taken, steps S10-S13 are repeated. Preferably, at least two measurements and estimation areas are determined for each VRU so that the overlapping areas of the estimation areas can be combined in step S15 to provide a predicted location. As discussed above, the behaviors can also be determined. The timing between measurements and whether or not the VRU should be treated as static or not can be selected based on the desired detection scheme. For example, if it is desired to determine the behavior of the VRU, it may be desired to not treat the VRU as being static. On the other hand, treating the VRU as static and choosing a short time interval between measurements can allow for a quick and accurate location prediction by leveraging the relatively high speed of the vehicle. In a step S16, the locations and/or behaviors can be stored in the Cloud and used for future predictions and traffic management or vehicle control decisions. For example, other vehicles can be informed of the locations and/or behaviors to adjust their speed or route. In a step S17, the processing server which determined the predicted location and/or behavior in step S15 issues a notification of the locations and/or behavior. In step S18, in the case of an autonomous or semi-autonomous vehicle (e.g., one equipped with safety override rules), the notification can trigger automated control actions and, in the case of a vehicle operated or assisted in operation by a human driver, the location and/or behavior can be displayed to the driver.

According to an embodiment of the present invention, trilateration can be performed using three wireless receivers which are part of the vehicles and/or part of RSUs. Thus, there exist three wireless receivers which can receive signals at the same time from one wireless sender (in the wireless range of the wireless sender). At least one of the receivers has an associated processing unit and each receiver has its own accurate real-time location information (e.g., using GPS). Each wireless receiver receives signal(s) from the sender through their antennas at the same time. Each received signal has an associated RSSI value. RSSI values of the receivers as well as the locations of the receivers are gathered (transmitted) to the receiver which has the processing unit. The receiver with the processing unit defines circles for each receiver using the respective received RSSI values. Each circle has the center point which is the location of the corresponding receiver and radius which is equal to the distance estimation. The intersection point of the three circles can then be determined by the processor and used as the location estimation. Because the intersection point may have some possible error based on the accuracy of the location estimation based on RSSI signal strengths, the location estimation can be defined as a circular area to account for such possible error and given as an output to the vehicle, for example, for taking control actions.

In the foregoing example of trilateration, the wireless receivers could be all mobile (e.g., attached to vehicle(s)), all static (RSUs) or a combination of both. The scenario can also be extended to situations where there are more than three receivers by either using all of them or a combination of at least three of the receivers. The receivers could be close to each other or far from each other. In the case that only one mobile receiver is attached to a vehicle, three different measurements can be performed (based on current location of the vehicle and the RSSI value at the same time) and the trilateration technique can be applied based on the at least three measurements.

Figure 7:
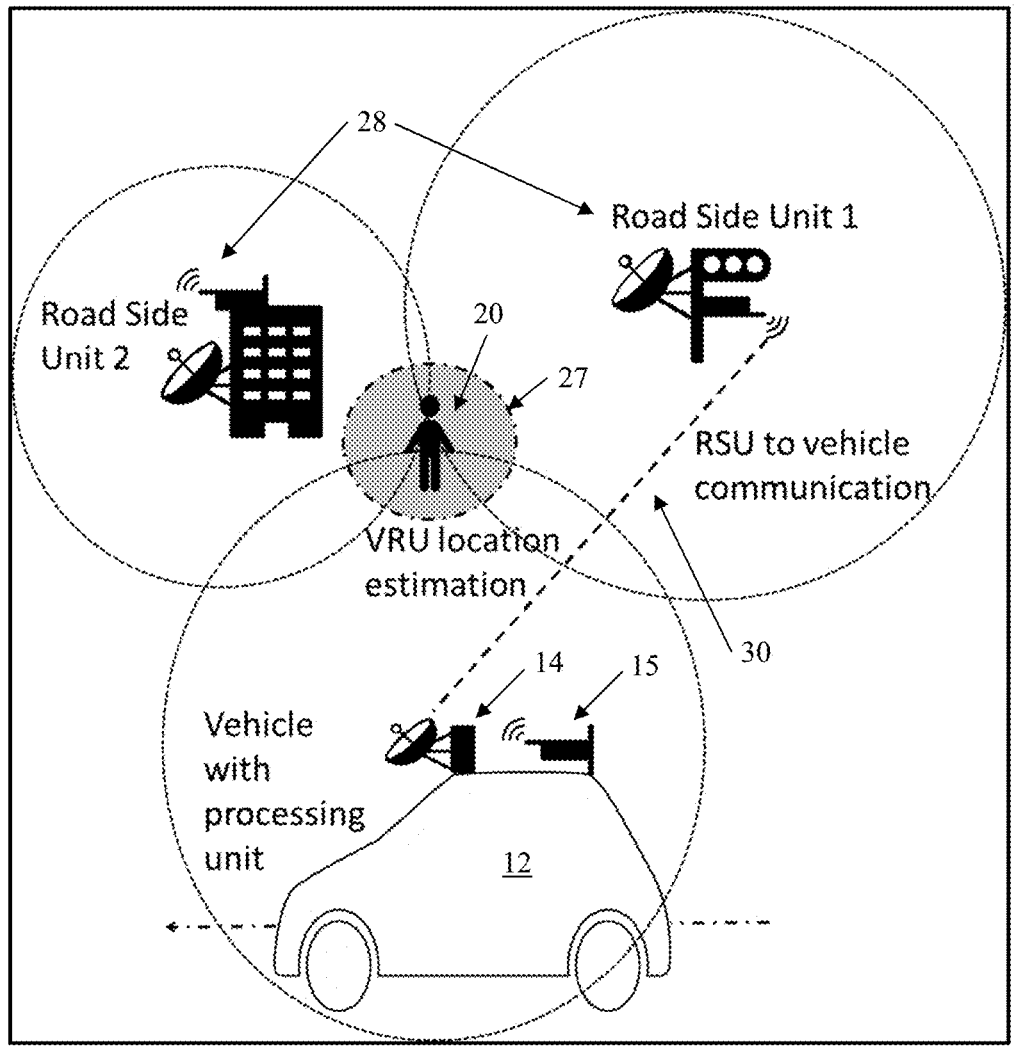
FIG. 7 is a schematic overview of a method for performing trilateration using three wireless receivers according to an embodiment of the present invention.

FIG. 7 illustrates an example of using trilateration to determine the location of a VRU with a mobile device 20 using two RSUs 28 and a vehicle 12 equipped with at least the wireless receiver 14 and optionally the wireless transceiver 15. The RSSI values of the two RSUs and their locations are sent to the vehicle through wireless communication 30. The vehicle's processing unit defines a circle for each receiver, where the receiver's location is the center and the radius is based on the distance estimation using the RSSI value. The output of the VRU location estimation is also defined as a circle indicating an estimation area 27, where the center point is the estimation and the circular area defines the accuracy of the estimation, such that the VRU is expected somewhere in the defined circular area with high confidence. Processing units of the RSUs or, for example, in the Cloud could also be used for the trilateration.

Figure 8:
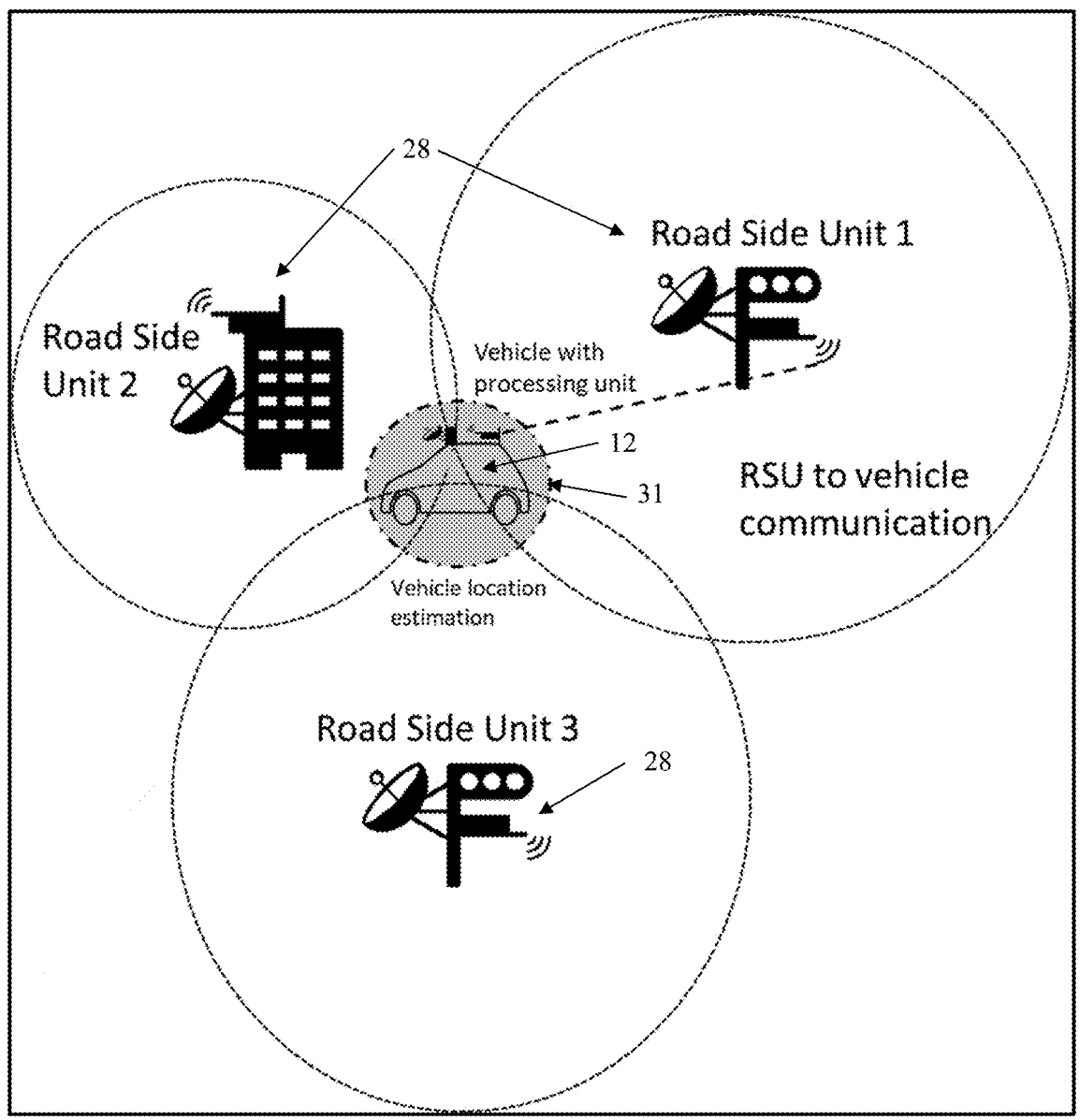
FIG. 8 is a schematic overview of detecting vehicles using wireless receivers according to an embodiment of the present invention.

FIG. 8 illustrates an example of determining the location of a vehicle 12 using three RSUs 28. The method for trilateration described above can be analogously applied for detecting vehicle locations, similar to the detecting VRU locations. In this scenario, the target becomes a vehicle instead of a VRU, assuming one of the two possibilities: 1) a wireless sender device attached to the target vehicle broadcasting wireless signals, or 2) a mobile device carried by a passenger broadcasting signals from the vehicle which does not have a wireless sender device. The wireless receivers can receive these signals and determine RSSI values from them. The trilateration technique can be applied for the target vehicle 12 similar to the VRU. One of the receivers gathers the data to its processing unit for performing the trilateration. Thus, the circles defined by the positions of the RSUs and the respective RSSI values provide the location estimation at the center of the estimation area 31 having a radius accounting for possible error.

The wireless receivers can be attached to the RSUs, other vehicles, or a combination of both. This embodiment can be useful for scenarios where a target vehicle 12 does not have an interface with the other vehicles or RSUs, such that even if the target vehicle knows its own location using GPS, it cannot transmit this information to the RSUs or to other vehicles. In this case, location of the target vehicle can be estimated. However, the technique that leverages the relative stability of the location of VRU as opposed to the relative mobility of the vehicle does not apply to this scenario, unless the target vehicle is static at the time (e.g., in parking state or waiting in a traffic light) or moving very slow compared to another vehicle which estimates the location of the target vehicle. Thus, according to an embodiment of the present invention, it is possible to both determine locations and/or behaviors of the VRUs, both with and without mobile devices, but to also determine locations and/or behaviors of vehicles.

According to a first exemplary embodiment considering a single pedestrian or a cyclist, detection can be considered in four different situations. The first two situations are based on the current wireless signal ranges considering Wi-Fi and Bluetooth. These ranges are expected in 30 meters range and in ideal conditions they can be considered for up to 100 meters. The second two situations are based on longer ranges using other technologies such as LoRa technology which enables longer range transmissions up to 22 kilometers.

Whether detection is considered to be short range or long range not only depends on the distance between the person and the vehicle, but also depends on the current speed of the vehicle, the vehicle's or the driver's reaction time and the vehicle's braking capabilities. All of these factors can be considered for estimating a stopping distance. The stopping distance can also be estimated using a combination of other various factors, such as the type of braking system (e.g., anti-lock braking system (ABS)), vehicle weight, tire pressures, etc. The braking distances are typically tested thoroughly by vehicle vendors and the results of such tests can be used as input for the VRU detection system, as well as for making decisions and taking actions based on the detected situation. Short range detection can be considered to occur when the estimated stopping distance is shorter than the distance between a detected person and the vehicle. Long range detection can be considered to occur when the estimated stopping distance is longer than the distance. According to these definitions, the following situations are considered:

1) Situation 1: Short range detection of expected behavior: This is the case when one or more people are detected in a short range (as defined above) and the estimated locations and/or behavior of the detected people are as expected (e.g., pedestrians waiting (not moving) in a bus stop (nearby, but not on the road)). In this case, the autonomous car or the driver can be notified with the location of the people.

2) Situation 2: Short range detection of unexpected behavior: This is the case when one or more people are detected in a short range and they are either (unexpectedly) located on the road or very close to the road or path of travel. In this case, the autonomous car or the driver is warned by the system for taking immediate action. This warning can include the location of the people and the type of unexpected behavior (e.g., waiting in the road or crossing the road). Even though it may not be possible to stop in sufficient distance based on the short range detection, in the case of an autonomous car, slowing or divertive action to mitigate the consequences of an accident, if plausible, can be immediately taken based on the warning.

3) Situation 3: Long range detection of expected behavior: This is the case when one or more people are detected in a long range scenario (as defined above) and the estimated locations and/or behaviors of the detected people are as expected. In this case, the locations of the people can be logged and stored in the Cloud without a notification by the system. On the other hand, if the traffic law enforces a certain speed limit in a case where pedestrians are present, the system can notify the vehicle or the driver to reduce the speed if necessary.

4) Situation 4: Long range detection of unexpected behavior: This is the case when one or more people are detected in a long range scenario and they are either (unexpectedly) located on the road or very close to the road. In this case, the autonomous car or the driver is warned by the system for taking action. This warning includes the location of the people and the type of unexpected behavior. In the case of an autonomous car, preferably stopping, or alternatively divertive action to prevent any accident, can be taken immediately based on the warning.

According to a second exemplary embodiment, the present invention can be used for self-enforcement of speed limits. The VRU detection estimation system outputs the estimated locations of people or cyclists around the vehicle. Based on the number and location of VRUs, as well as on the type of road (e.g., a highway or a street), certain speed limits can be dynamically enforced to the drivers or the autonomous vehicles. The speed limit could be centrally enforced by a traffic authority or it could be decided by the car manufacturer as a safety measure. The processing server of the vehicle could be provided with a memory containing a set of rules based on detections of types of VRUs and their associated behaviors so that automated warnings and actions can be taken based on the detection. If the speed limit dynamically changes and if the vehicle's current speed is higher than the enforced limit, then the driver is notified to reduce the speed or the vehicle can automatically reduce its own speed. Self-enforcement of the speed limit occurs when the vehicle automatically adjusts its own speed. Moreover, the vehicle can broadcast a message which includes the current speed limit and the location of the vehicle itself. Other vehicles which receive this message can directly apply the new speed limit and reduce their speed if necessary (e.g., using vehicle-to-vehicle communication).

According to embodiments of the present invention, detection can occur more quickly for time-critical situations where it is critical for a driver or an autonomous car to take immediate action. For example, in such situations, the processing of wireless signals (e.g., RSSI levels) is computationally much less intensive than that of processing video or image signals according to existing VRU detection methods. In contrast to the multi-dimensional nature of videos and the high-definition which increases the number of pixels as well as the number of frames per second for the camera-based solutions, a wireless signal-based solution reduces the computational complexity dramatically. For example, RSSI levels can be represented by merely a time-series data of double values. This reduction in data size to be processed can be efficiently leveraged for real-time signal processing for time-critical situations such as the Situation 2 (explained above), thereby significantly improving the time to detection.

Embodiments of the present invention provide, for example, for the following improvements:
1) Providing a vehicle which is itself a VRU detector based on wireless signals such as Wi-Fi and Bluetooth.
2) Providing a dynamic localization estimation approach for finding calibrated estimation areas in real-time through multiple measurements of wireless signals as the vehicle moves. This approach leverages the vehicle's relatively higher speed compared to the pedestrians' relatively lower speed. With the relatively higher speed, it can be assumed that the VRU is static (since, e.g., multiple measurements can be taken for the VRU in less than 1 second), so these measurements could be used for trilateration.
3) Simultaneous usage of wireless receivers for detecting signals from mobile devices and wireless transceivers for detecting body reflections of transmitted wireless signals.
4) The approach is computationally much less intensive compared to the existing computer vision-based solutions.
5) The approach can be applied using wireless devices which are much simpler and less expensive than the cameras used in image-based detection.
6) The approach can be easily tested with off-the-shelf solutions for localization.
7) The approach enables VRU detection even in the case of darkness or obstacles.
8) The approach avoids significant overhead in terms of storage, computation or communication.
9) Can be easily retrofitted to existing vehicles.

According to an embodiment, the present invention provides a method for detecting a VRU from a vehicle using wireless signals, the method comprising:

attaching or embedding a wireless receiver and a wireless transceiver to or in the vehicle;

receiving, by the wireless receiver, wireless signals sent by mobile devices in a vicinity of the vehicle and determining RSSI levels of the wireless signals;

receiving, by the wireless transceiver, wireless signals sent by the wireless transceiver and reflected back to the wireless transceiver from objects in the vicinity of the vehicle;

analyzing the RSSI levels of the wireless signals received by the wireless transceiver and the wireless signals reflected back to the wireless transceiver so as to determine a location of the VRU; and issuing a notification to the vehicle or a driver of the vehicle based on the determined location of the VRU.

Embodiments of the present invention can be implemented as part of intelligent transportation solutions, or provided to the car industry as a solution for VRU detection of autonomous cars as a complementary solution to camera-based technology.

Additionally, according to an embodiment of the present invention, it is possible to also alert the VRUs with mobile devices through pushing notifications in an application installed on the mobile devices. Notifications can also be pushed to vehicles and a the same time to nearby VRUs using an application on the mobile devices which subscribes by geolocation. VRUs could be alerted about approaching vehicles or areas where other VRUs are located, or could be alerted to cease with an unexpected behavior, such as walking into an intersection when the light is red or approaching a roadway at a location where it is known to be unsafe or there is no cross-walk. The notifications for the vehicles and/or the VRUs can also provide information taken directly or learned from the prior VRU locations and/or behaviors, for example stored in the Cloud. For example, information could be provided about certain areas where a large number of VRUs have been detected at particular times of the day, for example, for re-routing decisions.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting a vulnerable road user (VRU) using wireless signals, the method comprising:
    receiving, by a wireless receiver, wireless signals from a mobile device at a plurality of time intervals and determining received signal strength indication (RSSI) levels of the wireless signals;
    analyzing the wireless signals and the RSSI levels of the wireless signals received by the wireless receiver so as to determine a location of the VRU, wherein an estimation area for the VRU is determined at each of the time intervals and a calibrated estimation area comprising an overlap of the estimation areas is determined as a measurement of the location of the VRU; and
    issuing a notification to a vehicle or a driver of the vehicle based on the determined location of the VRU.

2. The method according to claim 1, wherein the wireless receiver is disposed at a first static location, and wherein a second wireless receiver is disposed at a second static location, the first and second locations being known with respect to each other, and wherein wireless signals received by the second wireless receiver and associated RSSI levels are analyzed together with the wireless signals received at the first static location to determine the location of the VRU.

3. The method according to claim 1, wherein the wireless receiver is attached to or embedded in the vehicle.

4. The method according to claim 3, wherein a second wireless receiver is disposed at a static location, and wherein wireless signals received by the second wireless receiver and associated RSSI levels are analyzed together with the wireless signals received at the vehicle to determine the location of the VRU.

5. The method according to claim 3, wherein the plurality of time intervals are less than one second apart for determining the estimation areas and the location of the VRU from the calibrated estimation area.

6. The method according to claim 5, further comprising:
    comparing a distance from the vehicle to the determined location of the VRU to an estimated stopping distance of the vehicle;
    determining a behavior of the VRU based on further wireless signals that are received by the wireless receiver at later time intervals; and
    determining whether the behavior of the VRU is expected at the determined location of the VRU,
    wherein the notification to the vehicle or the driver includes a description of the behavior where it is determined that the behavior is not expected for the VRU at the determined location of the VRU.

7. The method according to claim 6, wherein the vehicle is an autonomous vehicle, the method further comprising issuing a control action for stopping the vehicle or diverting a path of the vehicle based on a determination that the behavior is not expected for the VRU at the determined location of the VRU.

8. The method according to claim 6, further comprising storing the behavior and the determined location of the VRU in a database, wherein the determining whether the behavior of the VRU is expected at the determined location of the VRU is performed by checking the database.

9. The method according to claim 3, wherein the time intervals are less than 0.5 seconds apart for determining the estimation areas and the location of the VRU from the calibrated estimation area.

10. The method according to claim 3, wherein each of the estimation areas has a circular area comprising an estimated location at the center and a radius representing an expected error range, the estimated locations being based on the RSSI levels received at the respective time intervals.

11. The method according to claim 1, further comprising receiving, by a wireless transceiver, wireless signals sent by the wireless transceiver and reflected back to the wireless transceiver from objects in the vicinity of the vehicle, wherein the wireless signals reflected back to the wireless transceiver are used to determine at least one location of at least one additional VRU which does not have a mobile device.

12. The method according to claim 1, further comprising identifying the mobile device from the wireless signals received by the wireless receiver and determining that the VRU carries at least one additional mobile device based on the wireless signals from the VRU being received by the wireless receiver indicating a single entity carrying the mobile devices.

13. The method according to claim 1, wherein the wireless receiver includes a plurality of antennas which change directions during the receiving of the wireless signals from the mobile device, the method further comprising using trilateration on the received wireless signals to determine the location of the VRU.

14. The method according to claim 1, further comprising the vehicle self-enforcing a dynamic speed limit which was changed in the vehicle based on the VRU detection and broadcasting the changed speed limit to other vehicles in the vicinity using vehicle-to-vehicle communications.

15. A system for detecting a vulnerable road user (VRU), the system being configured to communicate with a wireless receiver configured to receive wireless signals from mobile devices, the system comprising:
    a processing server configured to analyze the wireless signals received at a plurality of time intervals from one of the mobile devices and received signal strength indication (RSSI) levels of the wireless signals received by the wireless receiver so as to determine a location of the VRU, wherein an estimation area for the VRU is determined at each of the time intervals and a calibrated estimation area comprising an overlap of the estimation areas is determined as a measurement of the location of the VRU; and an alert system configured to issue a notification to a vehicle or a driver of the vehicle based on the determined location of the VRU.

16. The system according to claim 15, wherein the wireless receiver is attached to or embedded in the vehicle.

17. The system according to claim 16, wherein the processing server is configured to analyze wireless signals received by a second wireless receiver disposed at a static location and associated RSSI levels together with the wireless signals received at the vehicle to determine the location of the VRU.

* * * * *